United States Patent
Mester

[15] 3,694,735
[45] Sept. 26, 1972

[54] WATER-COOLED EDDY-CURRENT TRANSDUCER FOR TESTING PRODUCT WHILE AT HIGH TEMPERATURE

[72] Inventor: Michael L. Mester, Lower Burrell, Pa.

[73] Assignee: United States Steel Corporation

[22] Filed: July 27, 1970

[21] Appl. No.: 58,423

Related U.S. Application Data

[63] Continuation-in-part of Ser. No. 775,002, Nov. 12, 1968, abandoned.

[52] U.S. Cl. ................................................324/40
[51] Int. Cl. ............................................G01r 33/12
[58] Field of Search..................................324/40, 37

[56] References Cited

UNITED STATES PATENTS 2,958,037  10/1960  Riede et al....................324/41

OTHER PUBLICATIONS

Godshall et al.; Eddy-Current Inspection of Pipe at 2150 Deg. F. ASME Publication; Sept. 1966; pp. 1–9

*Primary Examiner*—Robert J. Corcoran
*Attorney*—Rea C. Helm

[57] ABSTRACT

A circular chamber is formed, in part, by a cylinder of heat-resistant material around which inductor coils are wound. An enclosing sleeve is telescoped over the cylinder. The cylinder admits therethrough axially moving elongated product at high temperature. A nipple extending radially of the cylinder and outwardly through the chamber accommodates leads connecting the coil to defect-detecting apparatus. The chamber has inlet and outlet connections for circulating cooling liquid therethrough.

3 Claims, 4 Drawing Figures

PATENTED SEP 26 1972 3,694,735
FIG. 2  FIG. 4  FIG. 1
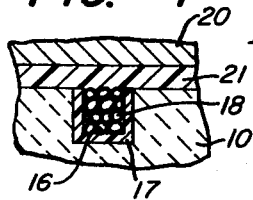
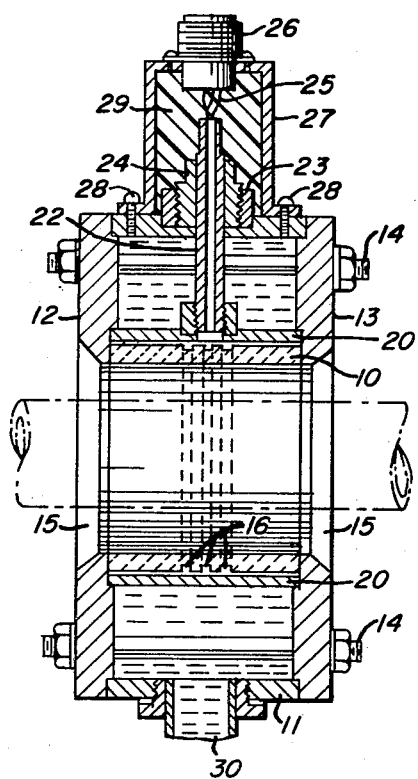
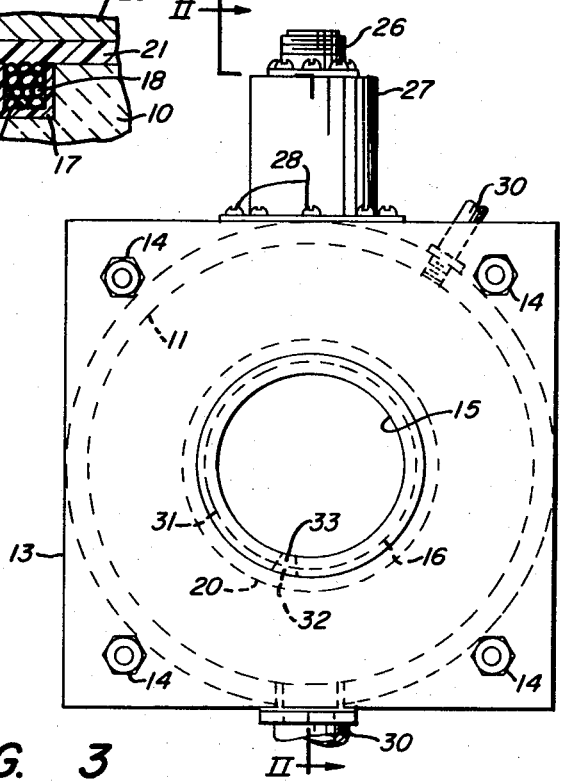
FIG. 3
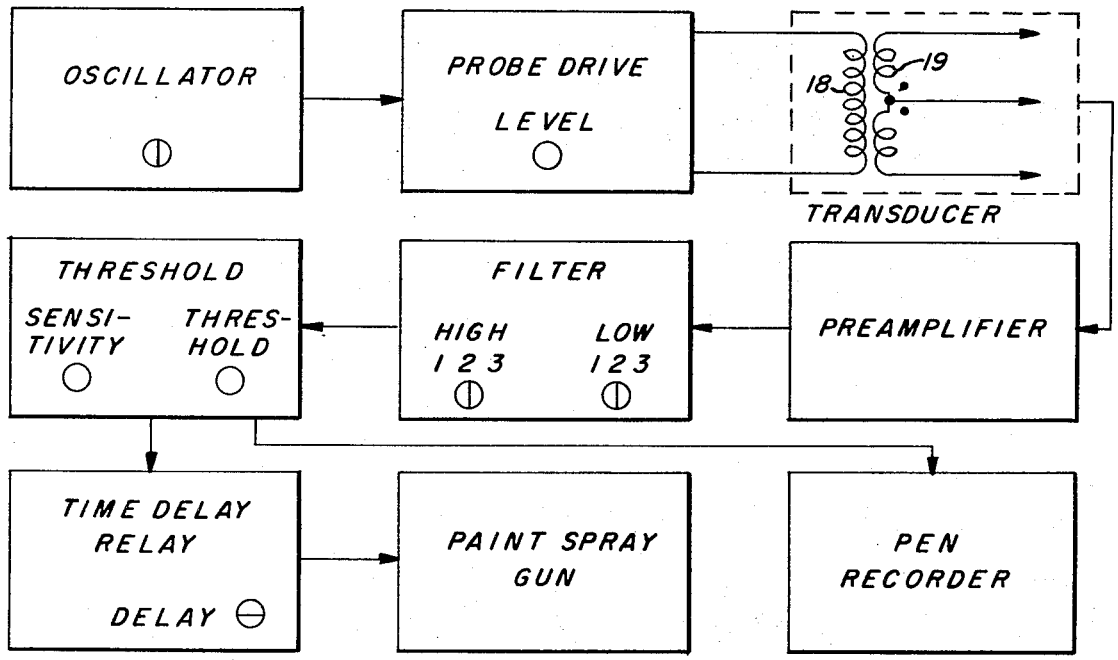
INVENTOR
MICHAEL L. MESTER
By Rea C. Helm
Attorney

WATER-COOLED EDDY-CURRENT TRANSDUCER FOR TESTING PRODUCT WHILE AT HIGH TEMPERATURE

This application, which is a continuation-in-part of my copending application Ser. No. 775,002 filed Nov. 12, 1968, and now abandoned relates to the eddy-current testing of elongated product, e.g., rod or welded pipe, particularly while hot from the manufacturing process and, more specifically, to a circular transducer adapted to be traversed by axially moving product, effecting to provide an indication of defects spaced therealong.

Transducers of the type indicated have usually taken the form of an inductor coil wound on a cylindrical form or core but such construction is not well adapted for testing product while hot from the manufacturing process, such as welded pipe or hot rolled rods. For such use, these devices should be durable as well as sensitive and reliable and transducers that I am aware of such as shown in the American Society of Mechanical Engineers publication 66–PET–36 entitled "Eddy-Current Inspection of Pipe at 2,150°F" have not met these requirements. My invention provides a construction having these properties.

BRIEF SUMMARY OF THE INVENTION

In the preferred embodiment, my invention comprises a ring or length of tube, of heat-resistant material, dimensioned to permit travel therethrough of the product to be tested, e.g., welded pipe. An inductor coil is wound on the tube length and an enclosing sleeve is telescoped thereover. An outer ring extends around the tube length in spaced relation thereto. Spaced end plates clamp the tube length and outer ring between them. The end plates have windows therein registering with the tube length. A nipple on the sleeve extends radially outward through the outer ring, so that leads from the coil may be taken out to the exterior. Inlet and exhaust connections to the outer ring permit cooling liquid, to be circulated through the space between it and the tube length.

BRIEF DESCRIPTION OF THE DRAWINGS

A complete understanding of the invention may be obtained from the following detailed description and explanation which refer to the accompanying drawings illustrating the present preferred embodiment. In the drawings:

FIG. 1 is a side elevation;
FIG. 2 is a longitudinal section taken along the plane of line II—II of FIG. 1;
FIG. 3 is a schematic diagram of the system in which the transducer is employed; and
FIG. 4 is an enlarged fragmentary section showing details of cylinder and sleeve.

DETAILED DESCRIPTION OF THE PREFERRED EMBODIMENT

The transducer of my invention is made up principally of coaxial inner and outer cylinders 10 and 11 which may be short lengths of tube, clamped between spaced end plates 12 and 13 by through bolts 14. The end plates have openings or windows 15 therein registering with the opening through the inner tube length 10. Cylinder 10 is of heat-resistant material such as alumina, or high-temperature metal, and has a plurality of circumferential grooves 16 therearound. The grooves in cylinder 10 are covered with a tetrafluoroethylene tape 17 for electrical and thermal insulation. Inductor and sensing coils 18 and 19 (FIG. 3) are wound around the tube length fitting in these grooves. A sleeve 20 surrounds the tube length, being telescoped thereon with a small clearance. The clearance is filled with a thermal conductive epoxy resin 21, such as Stycast 2850 ft. manufactured by Emerson & Cuming, Inc.

A nipple 22 seated on sleeve 20 extends radially therefrom through a tubular boss 23 welded on the exterior of the outer tubular length 11. A gland 24 threaded into boss 23 seals the space between the latter and the nipple 22. Leads 25 from coils 18 and 19 are taken out through the nipple and to an electrical connector 26 secured in a flanged cap 27 alined with the nipple and fastened to the outer tubular length by screws 28. The volume inside cap 26 is filled with a potting compound 29 to prevent moisture condensation on the electrical connections to the transducer. Provisions for circulating cooling water through the space between sleeve 20 and tube length 11 include inlet and outlet ports 30 to which pipe or hose connections may readily be made.

The assembly of tube lengths 10, 11 and end plates 12, 13 is mounted in any suitable manner in line with the output of a pipe-welding machine, for example. Pipe as manufactured and while still hot, passes longitudinally through the transducer. Excitation of coil 18 induces eddy currents circumferentially of the pipe. Slight variations therein caused by pipe defects such as unfused welds (black spots), dents and poor welds visible to an observer, are picked up by the sensing coils and, by signals thus generated, defects are recorded and indicated by a known system as shown in FIG. 3. This system is a Magnaflux Corporation SD 220, the several elements of which are labeled in the drawing.

While the cylinder 10 may be made entirely of ceramic material because of its good abrasion resistance, the ceramic material tends to crack from end weld impact or thermal gradients caused by flushing water. A cylinder 10 made of metal reduces sensitivity because of eddy currents flowing within the cylinder. Therefore, I prefer to make the cylinder of a main metallic section 31 having a wedge-shaped longitudinal slot 32, as shown in FIG. 1, with the narrow end towards the test piece, and filling the slot with a non-electrical conducting high temperature ceramic section 33. Thus no eddy currents will flow in the cylinder and the sensitivity will be improved. The wedge shape locks the ceramic in the slot.

It will be evident that my improved transducer affords a single sturdy structure, well suited to conditions normally encountered in heavy industry. The inductor and sensing coils are effectively shielded against the heat of the product and the entire device may readily be designed for adequate strength without excessive cost.

Although I have disclosed herein the preferred embodiment of my invention, I intend to cover as well any change or modification therein which may be made without departing from the spirit and scope of the invention as set forth in the claims.

I claim:

1. A transducer for testing elongated product at elevated temperature comprising a length of tube of high temperature resistant material, said tube having a plurality of centrally disposed circumferential grooves therearound and an internal dimension sufficient to admit said product axially, an inductor coil and sensor coils wound around said tube in said grooves, a layer of heat resistant electrically insulating tape between said coils and said length of tube, end plates secured in abutting engagement with the ends of said length and having ports therein generally alined with the opening through the length, an outer wall surrounding said length in spaced relationship therewith and engaging said plates, an enclosing sleeve telescoped over said length with a small clearance therebetween, said enclosing sleeve being in abutting engagement with said ends to form a coolant chamber with said outer wall, a thermal conductive plastic filling said small clearance, an inlet port in said outer wall for admitting a liquid coolant into said coolant chamber, an outlet port in said outer wall for discharging said liquid coolant from said coolant chamber, a nipple extending generally radially from said length through said coolant chamber and said outer wall and a packing gland set on said outer wall, with said nipple extending through said gland and secured to said sleeve.

2. Apparatus as defined in claim 1 in which said length of tube includes a main metallic section having a wedge shaped longitudinal slot therein, with the narrow edge of said slot facing inwards and a ceramic section filling said slot.

3. Apparatus as defined in claim 1 including a flanged cap secured to said outer wall over the outer end of said nipple, an electrical connector on the outside of said cap with leads from said coils passing through said nipple and said cap to said electrical connector, and a potting compound filling the inside of said cap.

* * * * *